Patented Mar. 31, 1942

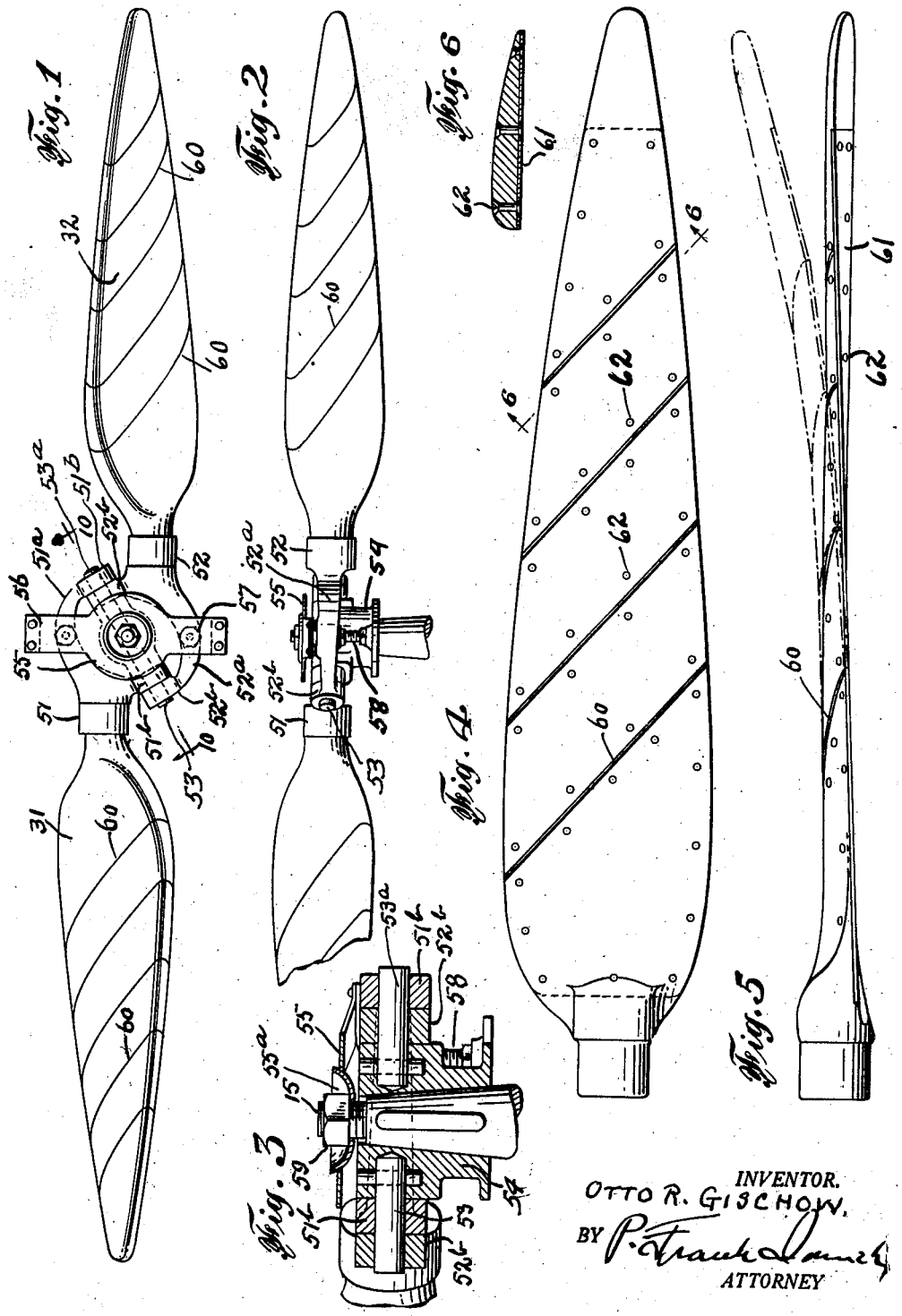

2,278,259

UNITED STATES PATENT OFFICE 2,278,259

PROPELLER AND THE LIKE

Otto R. Gischow, New York, N. Y.

Application October 8, 1937, Serial No. 167,923

3 Claims. (Cl. 170—164)

The invention relates generally to fans and other impelling devices, as propellers or so-called air-screws, as utilized in the propulsion of air and marine craft, and is more particularly directed to that type of device wherein the pitch of the blades may be varied or changed to meet the requirements of specific working conditions, commonly identified as variable or adjustable pitch devices.

While my invention, as hereinafter will become apparent, is susceptible of a wide range of application in the use of fans and similar impelling devices and is especially adaptable to the requirements of air and marine craft propulsion, for the purposes of this disclosure, I have elected to show and describe it, as it may be practiced in the construction and operation of propellers for aircraft of both the heavier-than-air and lighter-than-air types. It will be understood, however, that this is merely illustrative and is not to be construed, in any sense, as constituting a limitation of the scope of utility of my invention to this particular though important application.

The manner in which an air-screw or aircraft propeller functions is well known; also, the reasons for using blades of an airfoil section with a profile curvature to impart to them a so-called pitch, whereby they will meet or enter the air or relative wind at an angle. It is likewise well known that propellers of the conventional or standard fixed pitch types can perform with maximum efficiency only under specific conditions for which they may be designed. For instance, a propeller for a given airplane is usually designed to obtain maximum efficiency at or about the maximum speed which the airplane can attain in level flight, and, in consequence, any deviations from this attitude cause a loss in the propeller efficiency which results from the inability of the fixed blades to assume the correct angle to the relative wind in such deviations.

Efforts to overcome the disadvantages inherent to the fixed pitch type of propeller have been made by providing for the adjustment of the pitch of the blades by manually or mechanically actuated or controlled means, but such advantages as may flow from their use are more than offset by disadvantages which are a concomitant of their construction and mode of operation, so that they do not contribute materially to a solution of the propeller problem. For example, in the manually controllable pitch types, an additional burden is imposed upon the pilot and it is physically impossible for him to function the mechanism for effecting changes in the angles of the blades to meet the constantly varying air conditions and the changes in the attitude of the ship in consequence thereof, or in response to the functioning of the controls. In so-called "bumpy" air, it is obvious that even were the pilot relieved of all other duties that devolve upon him in handling his ship, he would be unable to adjust the propeller pitch as frequently and as rapidly as would be requisite to the maintenance of maximum efficiency. The result is that blade adjustments are generally confined to those for climbing, power glides and level flight. Further, the mechanisms employed in the manually controllable pitch propellers are complicated and costly to produce and require frequent servicing to maintain them in operating condition, which, of course, adds to the maintenance costs of the ship in which they are used. The same objection as to complicated and costly mechanisms and increased up-keep costs apply to those designs in which the engine speed is mechanically governed by a change in the pitch of the blades of the propeller, even in a greater degree. Here, again, maximum performance cannot constantly be attained, because of the time element in the translation of the blade movement into engine-governing action, in many instances the response of the engine to the controlling media being sluggish, especially in the higher altitudes.

In order to attain maximum propeller efficiency at all altitudes, as in climbing, level flight and normal deviations therefrom, the pitch of the blades and of the blade elements must be susceptible to variation to meet the relative wind at the correct angle; also, if the full value of the pitch variation is to be realized, the change in the blade angle must occur entirely automatically and in response to aerodynamic forces. Otherwise, as in the manually and mechanically operated types of adjustable pitch propellers heretofore referred to, the attainment of maximum efficiency at all flight attitudes and under the continuously changing air and wind conditions is impossible.

As in aircraft operation, greater propeller efficiency could be attained in the operation of marine craft were the blades of the propellers or screws capable of automatically changing their effective pitch in response to the flow of the relative water and the engine speed; also ventilating apparatus, pumping mechanisms and other devices employing fans or impellers may be rendered more effective, in many forms of work, by providing for changes in the pitch of the blades in response to forces created in their operation, my invention, as hereinbefore pointed out, being susceptible of application in these arts with the same advantages that reside in its use in aircraft construction and operation.

Therefore, it is the general object of this invention to improve the construction and mode of operation of propellers, fans and all types of rotating impelling devices, embodying blades having a curved profile or pitch, to render them capable of maximum performance under divers operating conditions, instead of under limited conditions, as at present.

More specifically, it is an important object of this invention to provide a simple and economical method and means of constructing propellers, airscrews, fans and other similar impelling devices in a manner to permit their blades to automatically respond to forces generated in their operation to cause them to meet or enter the element in which they are operating at that relative angle or pitch which will result in maximum performance for the working conditions of the instant.

It is also an important object of this invention to provide an air-screw or aircraft propeller which will possess those characteristics and advantages that it has been pointed out are essential to performance at maximum efficiency at different flying attitudes and under the continuously varying air and wind conditions.

Another object of my invention is to provide a variable or adjustable pitch propeller for aircraft, in which the blades move to the correct angle to meet the relative wind, solely in response to dynamic forces which are components of flight, the change in angularity of the blades, therefore, being entirely automatic and independent of the functioning of any manually actuatable or mechanically operated means.

A further object of my invention is the reduction of propeller stresses to an approximately negligible degree, thereby rendering it possible to produce a propeller of a much lighter construction than at present and at the same time attain greater efficiency than in existing designs, as heretotofore set forth. This, of course, applies with equal force to propellers of marine craft as well as to those designed for functioning with aircraft and to other similar impelling devices.

My invention also contemplates a propeller in which the pitch of the blade elements is variable automatically in response to forces which are a component of its operation, this variability in the pitch of the elements, which may occur in conjunction with a change in angle of the blade as a unit, relatively to the propeller hub, or otherwise, materially increasing the performance of the propeller under all operating conditions.

Other objects and advantages flowing from the practicing of my invention will become manifest as the description proceeds and I would have it clearly understood that I reserve unto myself all rights to the full range of equivalents, both in structure and avenues of use, to which I am entitled under my invention in its broadest aspect.

For the purposes of this disclosure, I have illustrated certain practical embodiments of my invention, as it may be practiced in the construction and operation of aircraft. However, my invention may take other forms to meet specific requirements of production and use in aircraft operations and also in the operation of marine craft, as well as in various apparatus employing impelling devices, to which it may be applicable, in attaining the objectives hereinbefore set out and within the purview of the appended claims.

In the drawing:

Figure 1 is a plan view of a further modification of my invention, as it may be practiced in aircraft construction and operation.

Figure 2 is a view in elevation of the hub structure of the arrangement shown in the preceding figure.

Figure 3 is a sectional elevation on the line 10—10 of Figure 1.

Figure 4 is a plan view of a blade, conforming to my invention, wherein the blade elements are relatively movable, for imparting to the blade the correct angle or pitch for the performance of the instant work at maximum efficiency.

Figure 5 is a view in elevation, looking at the leading edge, of the blade shown in the preceding figure, in which the relative movements of the blade elements are depicted in dot-and-dash lines, and Figure 6 is a transverse sectional view on the line 6—6 of Figure 4.

Referring now to the drawing in detail, in which like characters of reference are employed to designate similar parts in the several views, and more particularly to the structure of Figures 1 to 3, inclusive, 15 indicates the forward end of the engine shaft, to which the complementally bored hub-member 54, preferably of the configuration shown, is splined or keyed and locked in any suitable manner, such as hereinafter described. Associated with this hub-member 54 are a pair of blades 31 and 32 mounted for relative movement to each other and relatively to said hub, as hereinafter set forth, to permit them to move in response to aerodynamic forces effective thereon to vary the pitch of the propeller.

The blades 31 and 32 may be of any appropriate design and formed of wood or metal, though, in order to attain certain important objectives of my invention, I prefer to use blades of the lightest material available for the purpose and which, at the same time, will possess the requisite strength and durability under operating and climatic conditions, such as the so-called compressed wood from which blades are now being produced.

The blades may conform to standard specifications, as to length, air-foil section and pitch, or may be of a special design. When they are rigidly mounted in the respective sleeves or sockets 51 and 52, which may be internally threaded to mesh with complemental threads upon the reduced portions of the roots of the blades, for the purpose, or otherwise, the longitudinal axis of each blade will be alined with the longitudinal axis of its supporting sleeve or socket, since the blade then becomes virtually a continuation of the socket and vice versa. The common longitudinal axis of the blade and its socket, as will be clearly evident from Figure 1, angularly intersects the axis of rotation of the associated bearing member and, in consequence, rotative movement of the bearing member 51b, for example, will result in a like movement of the socket 51 and the blade 31 carried thereby. However, because of the angular offsetting of the blade relatively to the bearing member 51b, the blade will move in a path about or around the axis of rotation of the latter member, the degree of angularity between the latter axis and that common to the socket 51 and the supported blade 31 remaining fixed or invariable. In other words, assuming that the bearing 51b should make a complete revolution, the blade 31, because of its offset connection thereto, would traverse what may be termed a conical path, with its apex at the point of intersection of the axis of rotation of the bearing 51b by the common longitudinal axis of the socket 51 and blade 31, while the base would be described by the blade tip. In actual practice, the bearing need not make a complete revolution, a comparatively short range of arcuate movement sufficing. Therefore, suitable stops may be provided, such as hereinafter described, to limit the rotative movement of the bearings, if required, or such stops, in certain instances may be entirely eliminated, without detrimentally affecting the performance of the propeller, as a whole.

Since the blades are freely movable with relation to the hub and relatively to each other, they may adjust themselves, in response to aerodynamic forces effective thereon, to obtain maximum performance at all attitudes. In other words, they are self-adjusting, as to pitch, so that at all flying attitudes, their leading edges will meet the relative wind at the correct angle for attaining the maximum thrust for the torque delivered to the propeller. For example, in taking-off, in climbing or in any nose-up attitude, whether as a result of the functioning of the controls, or otherwise, the thrust and torque will set up a moment about the center of the propeller which will have a tendency to tiltingly urge the blades forwardly on their respective axes of rotational movement. However, at the same time, the component drag and centrifugal force will also set up a moment about the propeller, acting to oppose the forward tilting of the blades, and, therefore, when the moment of the drag and centrifugal forces equals that of the thrust and torque, the blades will be poised at the correct pitch or angle of attack, in meeting the relative wind, for the attitude at which the airplane is flying, it being understood that the movement of the blades is only in that degree wherein the counteracting forces neutralize each other under the instant flight conditions. Now, as the airplane levels out, the aerodynamic thrust manifestly, becomes lighter and the counteracting drag and centrifugal forces of the propeller, will then become effective to urge or tilt the blades rearwardly from such position as they may have assumed in the nose-up attitude, to increase the pitch, the increased pitch, under light air load conditions, of course, making it possible to attain better cruising and maximum speeds. It will be understood that the tilting of the blades may continuously vary in flight, as they adjust themselves to the changes in the thrust and torque and resultant drag and centrifugal forces, to impart to them that pitch which is most efficient at the flight instant. The self-adjusting blades of my structure will be most advantageous in altitude flying and, because of their instantaneous reaction to the constantly varying conditions of flight, solely in response to activating forces developed in the functioning of the propeller itself and without the intervention of other control media, my propeller will be highly efficient in operating in "bumpy" air, where the abrupt changes in the relative wind cannot be met by existing types of adjustable pitch devices.

The socket members 51 and 52, to which the blades are fixed, as previously described, embody bifurcated extensions 51a and 52a, provided with the aforesaid bearings 51b and 52b, alined to receive the pins 53 and 53a carried by the hub 54. These pins, as will be observed, are set at an angle to the center lines of the respective blades, which are offset relatively to each other, and form the axis on which the socket members 51 and 52 may rock or rotate, as the blades react to the air thrust and centrifugal force to increase or decrease their pitch, as hereinbefore set forth. Spanning the forward end of the hub 54, which is connectible to the engine shaft as in the other described embodiments of my invention, I provide a spring metal plate 55 having peripheral extensions 56 and 57 which overlie and contact with the respective socket portions 51a and 52a to control their movement on the pin 53 and to urge them into a normally low pitch position with relation to the stop 58 carried by the hub 54, which, preferably, is of an adjustable type, as shown, to provide for variations in the low pitch setting, to meet different conditions in the use of my propeller. Of course, in lieu of the element 55, any other suitable device may be employed that will serve the same end and this, likewise, applies to the stop 58. As shown, for example, the plate 55 is retained in its functioning position in the assembly by a cup-washer 55a which is engaged by the securing nut 59, but as stated this arrangement may be deviated from to suit production or other requirements.

It will be noted from the construction shown in Figures 1 to 3, that each of the blades 31 and 32 may be provided with a series of slots, generally indicated at 60, which are disposed transversely of the face of the blade and at an angle to the center line thereof. These slots may be of the same depth or their depths may vary, the number being determined by the effective blade elements. By utilizing these slots each of the elements of each blade is rendered capable of adapting itself to the forces immediately effective upon it to assume the correct angle or pitch ratio, the change of angle being induced by the air thrust and the counteracting centrifugal force, in the manner previously described, in varying amounts along the blade from tip to root. In the use of a wood blade, these slots may be formed by saw-cuts or otherwise while in metal blades they may be formed by divers existing methods. For instance, as shown in Figures 4 to 6, inclusive, the equivalents of the slots 60, in a wood or metal blade may be produced by assembling the several blade elements upon a supporting sheet 61 of flexible material, as spring or other metal or, in lieu of a single sheet, strips of such flexible material may be utilized to interconnect the adjacent blade elements. Obviously, the elements may be riveted to the flexible material, as shown at 62, where the blade elements are of wood or metal or in the case of metal the elements may be welded to the flexible connector. In Figure 5, I have shown in dot-and-dash lines, the manner in which a blade constructed in accordance with my invention may yield in reacting to the force effective thereupon to present an angle of attack which may vary throughout the length of the blade, in proportion to the forces effective thereon and by means of which propeller performance may be brought to its peak under all flight conditions. While the slotted blade construction lends itself admirably to the attainment of its objectives in conjunction with the mounting of the blades for rotative or tilting movements, as heretofore described, it may also be employed to material advantage in existing types of propellers of both the variable pitch and fixed pitch types, in improving their efficiency and reducing propeller stresses.

From the foregoing, it will be apparent that a propeller conforming to my invention will provide the maximum propeller performance at all flight attitudes, the blades being self-adjusting to assume the correct angle or pitch in meeting the relative wind; also that by mounting the blades as described, blades of a much lighter construction than those now used may be employed, because of the elimination or reduction to a negligible degree of the propeller stresses which are a resultant of the torque, centrifugal forces and thrust, as governed by engine or air speed. Another advantage residing in my construction, is the elimination or reduction to a minimum of propeller noise, because of the automatic action or self-adjustment of the blades to the impinging air. Further, by my construction, virtually constant engine speed may be maintained at all flying attitudes, as when changing from straight flight to an upward or downward angle.

While I have described my invention, more or less specifically, with reference to the embodiments shown herein, as before pointed out various changes may be made in the mode of assembly of the different components and in their details of construction. For example, the angularity of the axis of rotation or tilting movement of the blades relative to their center lines may be varied or changed as practice may dictate or warrant for different types of propellers and different designs of aircraft. Also, while, as before stated I have set forth my invention with particular reference to its use in aircraft construction, it will be manifest that, as pointed out, it lends itself to adaptation to marine craft and to industrial apparatus as pumps, blowers and the like, without departing from the principles thereof, as stated in the foregoing objectives. All of these changes in structural details and arrangement, together with the use of my invention in other fields than air navigation, in conjunction with which I have elected to present it, fall within the spirit and scope of this disclosure as defined in the following claims.

I claim:

1. In combination with an airplane having an engine, a propeller embodying a hub mounted on said engine shaft for revolution therewith, a plurality of blades and means common to said blades for connecting them to said hub for movement relatively thereto and relatively to each other, in response to forces automatically acting on said blades at a flight moment, said means including a common axis upon which said blades are rotatable, disposed parallel to the face of said hub and angularly intersecting the longitudinal axes of the respective blades, and yieldable means carried by said hub effective on said mountings to control their forward movement and adjustable stops for limiting their movement in the reverse direction, said latter stops providing for a predetermined low pitch setting of said blades.

2. A propeller blade having an airfoil section, formed of a series of sections and means yieldably connecting adjacent sections in spaced relationship for relative flexure forwardly or backwardly, in the same or varying amounts to change the pitch ratio of the blade as a whole, said means presenting an uninterrupted surface for one side of said propeller.

3. A propeller blade having an airfoil section, one face thereof presenting an uninterrupted surface, the other being transversely slotted at a plurality of stations between the root and tip of the blade, to provide a series of elements capable of relative flexure, forwardly and rearwardly, in response to aerodynamic forces, to change the pitch of the blade in varying amounts between the root and the tip.

OTTO R. GISCHOW.